United States Patent [19]

Tricini

[11] Patent Number: 5,131,688
[45] Date of Patent: Jul. 21, 1992

[54] PIPE INSULATOR AND METHOD FOR MAKING SAME

[75] Inventor: John D. Tricini, Greensburg, Pa.

[73] Assignee: Coupling Systems, Inc., Pittsburgh, Pa.

[21] Appl. No.: 635,343

[22] Filed: Dec. 28, 1990

[51] Int. Cl.⁵ .............................................. F16L 55/00
[52] U.S. Cl. ...................................... 285/53; 156/79; 264/46.5; 285/292; 285/293
[58] Field of Search ................. 285/291, 292, 293, 55, 285/53, 21; 264/46.5; 156/77, 78, 79

[56] References Cited

U.S. PATENT DOCUMENTS

| | | |
|---|---|---|
| 278,800 | 6/1883 | Kline . |
| 1,856,415 | 5/1932 | Halperin et al. . |
| 2,924,546 | 2/1960 | Shaw . |
| 3,266,821 | 8/1966 | Safford . |
| 3,453,006 | 7/1969 | Levake . |
| 3,462,175 | 8/1969 | Johnson . |
| 3,553,164 | 1/1971 | Havell . |
| 3,561,795 | 2/1971 | Becher ............................ 285/292 |
| 3,614,137 | 10/1971 | Jacobson . |
| 3,686,747 | 8/1972 | Bagnulo . |
| 3,705,735 | 12/1972 | Davidson et al. . |
| 3,871,687 | 3/1975 | Dockree . |
| 3,993,331 | 11/1976 | Schwarz . |
| 4,011,652 | 3/1977 | Black . |
| 4,049,480 | 9/1977 | Kutschke .............................. 156/79 |
| 4,066,283 | 1/1978 | Struck . |
| 4,147,381 | 3/1979 | Schwarz . |
| 4,229,028 | 10/1980 | Gray . |
| 4,296,954 | 10/1981 | Fujimaki et al. . |
| 4,357,745 | 11/1982 | Chebowski ......................... 285/55 |
| 4,398,754 | 8/1983 | Caroleo et al. . |
| 4,461,736 | 7/1984 | Takagi ................................ 264/46.5 |
| 4,662,655 | 5/1987 | Fliervoft et al. .................... 285/293 |

FOREIGN PATENT DOCUMENTS

| | | | |
|---|---|---|---|
| 2258673 | 1/1974 | Fed. Rep. of Germany | 285/53 |
| 386252 | 1/1933 | United Kingdom | 285/53 |

*Primary Examiner*—Eric K. Nicholson
*Attorney, Agent, or Firm*—Thomas R. Shaffer

[57] ABSTRACT

An electrically insulated pipe coupling and method is disclosed in which a first sleeve member and a second sleeve member are positioned in axial alignment and include oppositely positioned end portions axially spaced from one another to create an axial space therebetween. A resilient annular seal portion is gradually formed in situ (preferably by applying liquid urethane onto a rotating mandrel) in the axial space. The seal portion is chemically bonding to the oppositely positioned end portions and creates a low pressure coupling seal between said first and second sleeve members. An outer protective layer made from continuous synthetic resin saturated fiberglass strand windings is encircled around at least a portion of the end portions of the first and second sleeve members to enclose the seal portion. Finally, a rigid reinforcing sleeve is embedded in and covered by the fiberglass windings of the outer protective layer.

21 Claims, 2 Drawing Sheets

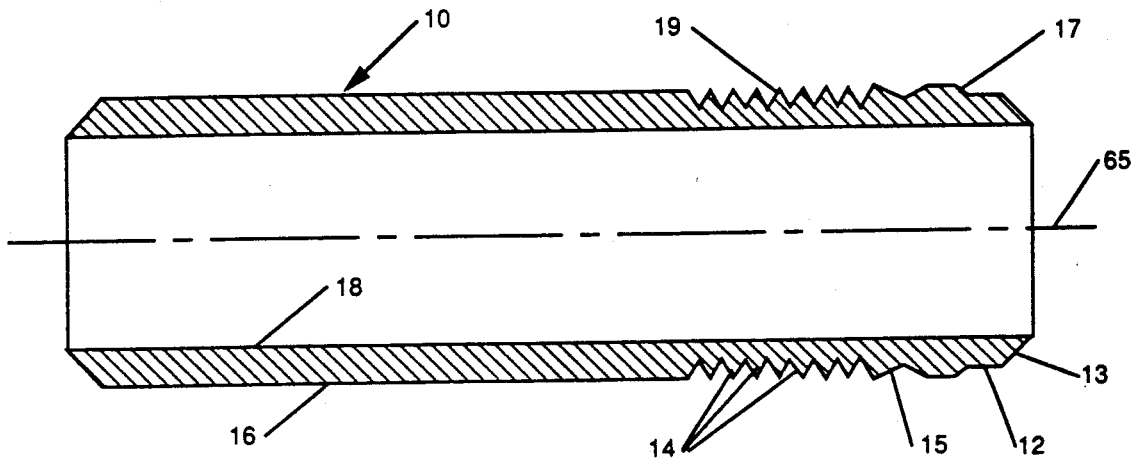
FIG. 3
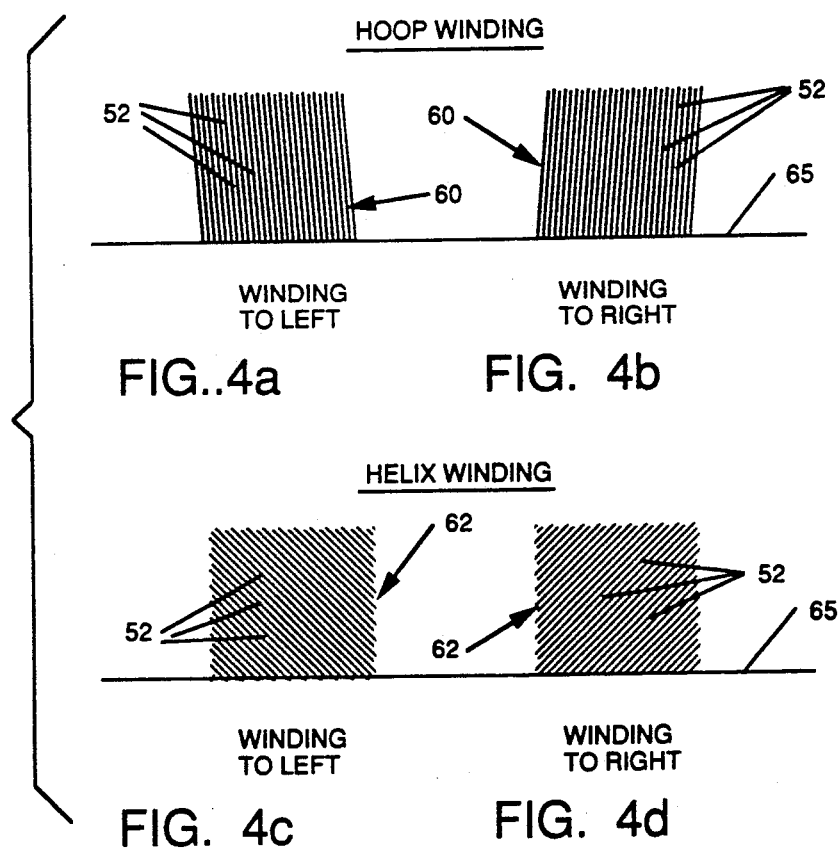
FIG. 4a   FIG. 4b
FIG. 4c   FIG. 4d

PIPE INSULATOR AND METHOD FOR MAKING SAME

BACKGROUND OF THE INVENTION

1. Field of the Invention

This invention relates to a pipe insulator to seal and electrically insulate coupled pipes and the method of making the same. More specifically, it relates to a pipe insulator which includes a urethane seal portion formed in situ to provide an initial leakproof seal and a protective outer layer formed of continuous strands of resin saturated fiberglass.

2. Description of the Art

Various forms of pipe couplings have been proposed to address the need for a pipe coupling which provides an adequate seal and which is effective in electrically insulating the joined pipes. Many prior devices rely upon axial compression of a separately formed seal member to create a mechanical seal. U.S. Pat. Nos. 4,398,754; 4,066,283; 3,705,735; 3,462,175; and 3,266,821, for example, teach some of such devices. Most of such devices utilize coupling members or sleeves which must be axially moved by a threaded engagement. The use of such threaded arrangements, however, create a potential leak path and are therefore, undesirable. Further, the provision of a mechanical seal created by compression is inherently inferior to a bonded seal formed in situ. For example, a proper mechanical seal would not be created if insufficient axial force is applied during installation, if defective or non-uniform sealing surfaces are provided or if dirt or other contaminants are present at the location of the seal.

Other prior devices have proposed the formation of a seal formed in situ by various molding operations. U.S. Pat. Nos. 4,229,028 and 1,856,415 are illustrative of such devices. The formation of a seal in situ is believed to provide significant advantages over devices which utilize a mechanical seal but a major disadvantage of these methods and products is that they require the provision of expensive molds and a time consuming molding operation.

Additionally, various prior art devices including, for example, U.S. Pat. Nos. 4,229,028; 4,147,381; and 3,553,164 provide either an inner or an outer layer of resin embedded fiberglass windings. However, these prior devices and methods fail to recognize the importance of the winding pattern in providing maximum strength against a variety of stresses to which the coupling is likely to be exposed.

Accordingly, there remains a need for an insulating pipe coupling which provides a seal portion formed in situ without the need for expensive molds or a time consuming molding process. There remains a further need for such a coupling which provides increased strength against a variety of stresses to which the coupling will be exposed. And still further, there remains a need for a simplified method of manufacture which reduces the time and cost of manufacturing an insulating coupling and which creates a superior product.

SUMMARY OF THE INVENTION

The present invention provides an electrically insulated pipe coupling comprising a first sleeve member and a second sleeve member positioned in axial alignment and including oppositely positioned end portions axially spaced from one another to create an axial space therebetween; a resilient annular seal portion gradually formed in situ in said axial space, said seal portion chemically bonding to said oppositely positioned end portions whereby said seal portion provides a low pressure coupling seal between said first and second sleeve members; an outer protective layer comprising continuous synthetic resin saturated fiberglass strand windings encircling at least a portion of the end portions of said first and second sleeve members and encircling all of said annular seal portion; and a rigid reinforcing sleeve embedded in and covered by said fiberglass windings of said outer protective layer.

In the preferred embodiment of the present invention, the end portions each have a plurality of concentric grooves provided therein and at least some of said fiberglass windings are tightly wound into said concentric grooves.

In the preferred embodiment, the annular seal has an outer diameter dimension substantially equal to an outer diameter dimension of said first and second sleeve members and said annular seal has an inner diameter dimension substantially equal to an inner diameter dimension of said first and second sleeve members.

Preferably, the annular seal portion is gradually formed in situ in a continuously applied layer of a liquid urethane material which hardens into a resilient solid urethane seal.

It is also preferable that the fiberglass windings of said protective outer layer are tension windings which exert a radially inwardly compressive force on said annular seal portion. More specifically, the fiberglass windings of said protective outer layer preferably include radially innermost windings which are provided in a closely spaced hoop winding pattern and radially outermost windings which are provided in a widely spaced helical winding pattern.

The electrically insulated pipe coupling of the present invention also preferably utilizes a rigid reinforcing sleeve and first and second sleeve members which are formed of metal and an annular seal portion and an outer protective layer which are formed of an electrically non-conductive materials.

Finally, it is preferred that terminal end portions of said first and second sleeve portion include a beveled or a curved surface to allow for the creation of a more effective seal.

The present invention also provides a method for making an electrically insulated pipe coupling comprising the steps of positioning and securing a first sleeve member and a second sleeve member in axial alignment onto a mandrel with end portions of said first and second sleeve members axially spaced from one another with an axial space therebetween through which said mandrel fully extends; rotating said mandrel and said secured sleeve members; applying a liquid urethane material onto said rotating end portions and onto said mandrel (or a protective sleeve secured to the mandrel) which extends through said axial space to gradually form a resilient seal portion between said end portions thereby joining said end portions together in a sealing engagement; encircling said end portions and said seal portion with continuous synthetic resin saturated fiberglass strand windings to form an outer protective layer; and placing a rigid reinforcing sleeve onto said outer protective layer when said layer is partially formed and thereafter completing the formation of said outer protective layer whereby said rigid reinforcing sleeve is embedded in and covered by said fiberglass windings of said outer protective layer.

The method also preferably includes the step of cutting a plurality of concentric grooves into said ends of the first and second sleeve member prior to securing said members onto said mandrel and providing at least some of said fiberglass windings in said concentric grooves.

In the preferred method of forming the seal portion, liquid urethane is gradually applied until said annular seal portion has an outer diameter dimension substantially equal to an outer diameter dimension of said first and second sleeve members.

Preferably, at least the portion of said mandrel which thereon) has an outer diameter dimension substantially equal to the inner diameter dimension of said first and second sleeve members.

It is also preferred that the fiberglass windings of said protective outer layer are encircled around said end portions and said seal portion under high tension to exert a radially inwardly compressive force on said annular seal portion. Further, it is preferred that the fiberglass windings of said protective outer layer are initially encircled around said sleeve ends and said annular seal portion in a closely spaced hoop winding pattern and that radially outermost windings of said protective outer layer are encircled around said sleeve ends and said annular seal portion in a widely spaced helical winding pattern.

Finally, it is preferred to also include the step of applying a chemical primer solution to said end portions prior to applying said liquid urethane.

These and other advantages and features of the present invention will be more fully understood on reference to the presently preferred embodiments thereof and to the appended drawings.

BRIEF DESCRIPTION OF THE DRAWINGS

FIG. 3 is an enlarged cross sectional view of a sleeve member according to the invention.

FIGS. 4a and 5a are graphical illustrations of closely wound hoop winding patterns for fiberglass windings of the present invention.

FIGS. 4c and 4d are graphical illustrations of widely spaced helical winding patterns for fiberglass windings of the present invention.

DETAILED DESCRIPTION OF THE PREFERRED EMBODIMENTS

Figure 1:
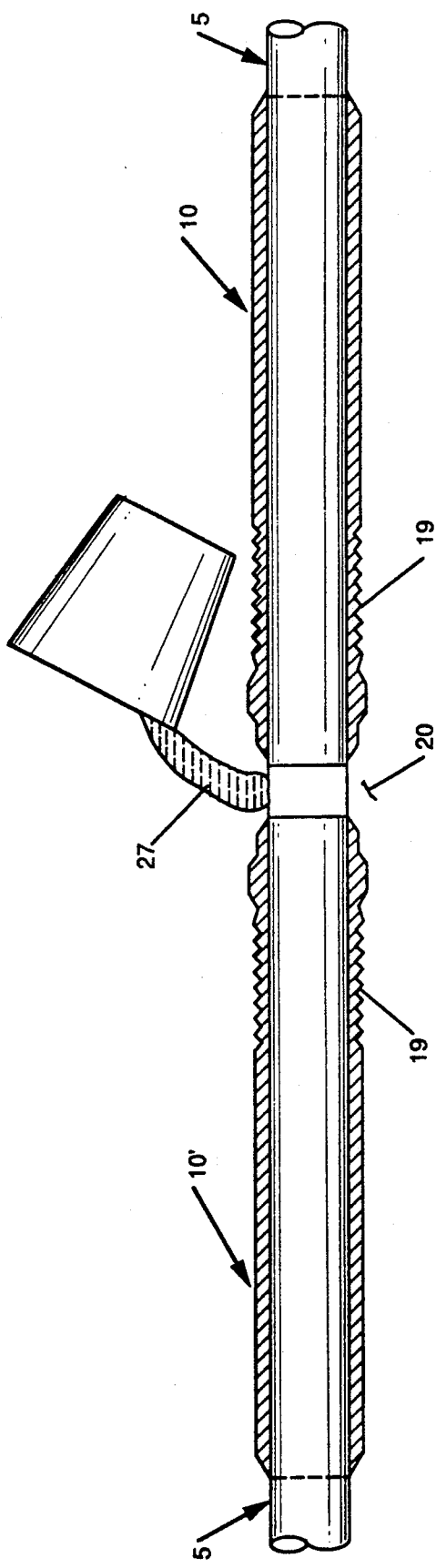
FIG. 1 is a cross sectional view showing a first sleeve member and a second sleeve member positioned in axial alignment on a mandrel in position for the formation of a urethane seal portion.
Figure 2:
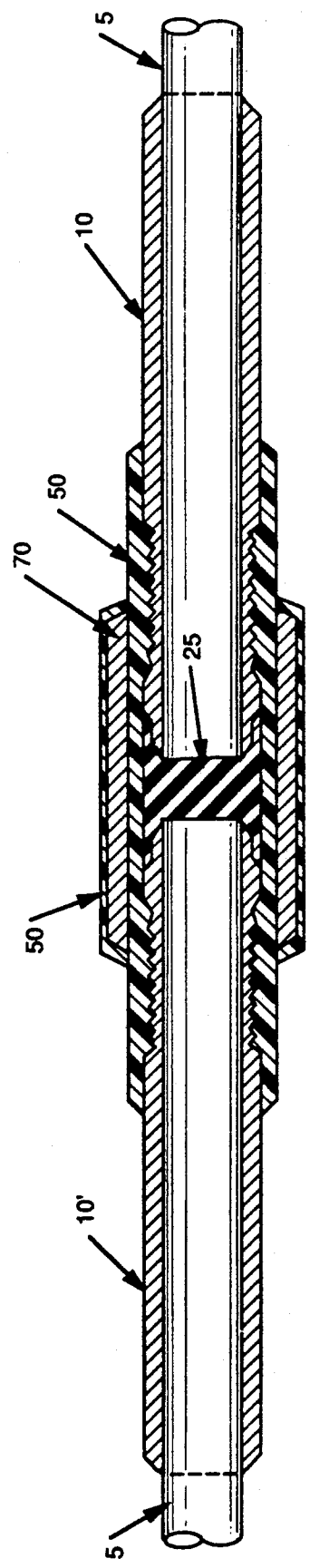
FIG. 2 is a cross sectional view of a completed electrical insulating pipe coupling according to the present invention.

Referring specifically to FIGS. 1 and 2, the electrical insulated pipe coupling according to the present invention includes a first sleeve member 10 and a second sleeve member 10' which are positioned in axial alignment on an expanding mandrel 5. It is noted that sleeves 10 and 10' are identical in construction and, accordingly, identical reference numbers apply equally to both sleeves 10 and 10'. Each of sleeves 10 and 10' include end portions 19 which, as shown in FIGS. 1 and 2, are axially spaced from one another to create an axial space 20 therebetween. A resilient annular seal portion 25 is gradually formed in situ in said axial space 20. The annular seal portion 25, when formed, provides a low pressure coupling seal between said first sleeve member 10 and second sleeve member 10'. Referring to FIGS. 2 and 3, it is noted that the axial space 20 extends over the surface of the mandrel in the space between sleeve members 10' and 10 and extends on each sleeve member to cover surfaces 17, 12 and 13 thereof.

In the formation of said resilient annular seal portion 25, liquid urethane 27 is gradually applied in the axial space as shown in FIG. 1 while mandrel 5 is rotated about central axis 65 of said sleeve members 10 and 10' (FIG. 3). The liquid urethane 27 chemically bonds to the oppositely positioned end portions of the sleeve described above and hardens into a resilient solid urethane seal. It will be understood that the annular seal portion 25 is gradually formed in situ in a continuously applied layer of liquid urethane material 27. After the annular space 20 is filled, a wide blade member (not shown) having a flat straight edge is utilized to create a smooth and uniform outermost surface on annular seal portion 25 which has substantially the same diameter as the outermost surface 16 of sleeve member 10.

Once the annular seal portion 25 is formed, an outer protective layer 50 comprising continuous strands of synthetic resin saturated fiberglass strand windings encircles at least a portion of the end portions 19 of the first and second sleeve members and encircles the entire outer surface of said annular sleeve portion 25. A rigid reinforcing sleeve 70 is embedded in and covered by the fiberglass windings 52 of said outer protective layer 50.

Referring specifically to FIG. 3, a plurality of closely spaced concentric grooves 14 are preferably provided in end portion 19 of sleeve 10. The concentric grooves are preferably cut into end portion 19 to create groove surfaces oriented at an angle of approximately 60° relative to the central longitudinal axis 65 of the sleeve 10. Preferably, an additional wide groove 15 having groove surfaces provided at an angle of approximately 15° relative to central longitudinal axis 65 is also provided immediately adjacent the seal portion 25. Resin saturated fiberglass strand windings 52 are tightly wound into grooves 14 and 15 to form the outer protective layer 50. Because concentric grooves 14 are utilized rather than a threaded pattern, it will be appreciated by those skilled in the art that a plurality of independent barriers are thus created rather than allowing for a continuous leak path which might result from a spiral threaded groove pattern. Further, it will be appreciated that the provision of at least one wide groove 15 allows for the provision of a larger amount of fiberglass material into such wide groove which necessarily provides greater strength and stability than the narrow and thinner portions of fiberglass provided in the narrower grooves 14. In order to create the annular space 20, it is noted that a portion of the sleeve material is completely removed to create an outer surface 12 which has a diameter dimension less than the outer diameter dimension of surface 16 of the sleeve. Additionally, the terminal end surface 13 of sleeve 10 is preferably beveled or curved to create a more effective sealing surface than would exist in the absence of such a beveled terminal end surface.

The annular sleeve 25 has an outer diameter which is substantially equal to the outer diameter dimension of the sleeve 10. Further, the annular seal 25 has an inner diameter dimension substantially equal to the inner diameter dimension of the first and second sleeve members. Accordingly, it will be appreciated by those skilled in the art that the annular seal creates no impediment to the passage of fluids through the coupling.

Referring to FIGS. 4a through 4d, the application of the outer protective layer 50 will now be described. As indicated above, outer protective layer 25 is formed from resin saturated fiberglass strand windings 52 which encircle the end portions 19 of the first and second sleeve and which encircle the annular sleeve portion 25. It is noted that the first approximate 35% of the thickness of the outer protective layer 50 is preferably formed in situ while the sleeves 10 and 10' are mounted on the mandrel 5.

Preferably, a computer controlled winding machine is utilized to control the application of the protective outer layer and the winding pattern of said strand windings 52. Preferably, the innermost windings are formed with a closely wound hoop winding pattern as shown in FIGS. 4a and 4b. The winding pattern is such that the windings are applied to the sleeve at an angle of between 80° and 90° relative to the longitudinal central axis 65 of the sleeves. Preferably, the angle is as close to 90° as possible so as to provide the greatest possible radially inward force against the seal portion 25. It will be appreciated that the winding machine applies the windings under great tension so as to apply such a radially inward force to the seal portion. It is noted that the winding machine may simultaneously apply a plurality of windings and applicant prefers to apply between 5 and 10 windings with each pass of the winding machine.

Once the thickness of the outer protective layer is approximately 35% of the total thickness, the computer controlled winding machine is preferably instructed to change the winding pattern from a closely wound hoop winding pattern to a widely spaced helical winding pattern as shown in FIGS. 4c and 4d. Preferably, the widely spaced helical pattern is provided with each strand applied to the coupling at an angle of between approximately 45° and 70° relative to the longitudinal central axis 65 of the sleeve. Applicant has successfully utilized a widely spaced helical angle of approximately 60° which provides satisfactory results. It is noted that the use of a widely spaced helical winding pattern for the outermost 65% of the outer protective layer provides increased resistance against any longitudinal pullout or movement of the sleeves. Like the inner hoop winding strands, the outer helical winding strands are applied under high tension.

Figure 5:
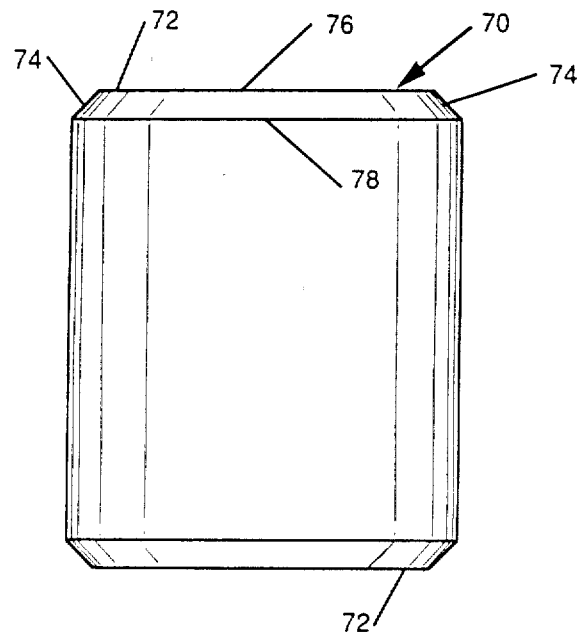
FIG. 5 is an enlarged cross sectional view of a rigid reinforcing sleeve according to the present invention.

Referring to FIG. 5, the rigid reinforcing sleeve 70 is shown. Rigid reinforcing sleeve 70 has an outer surface 76, an inner surface 78 and is provided with a beveled surface 74 at each end 72 thereof.

Figure 6:
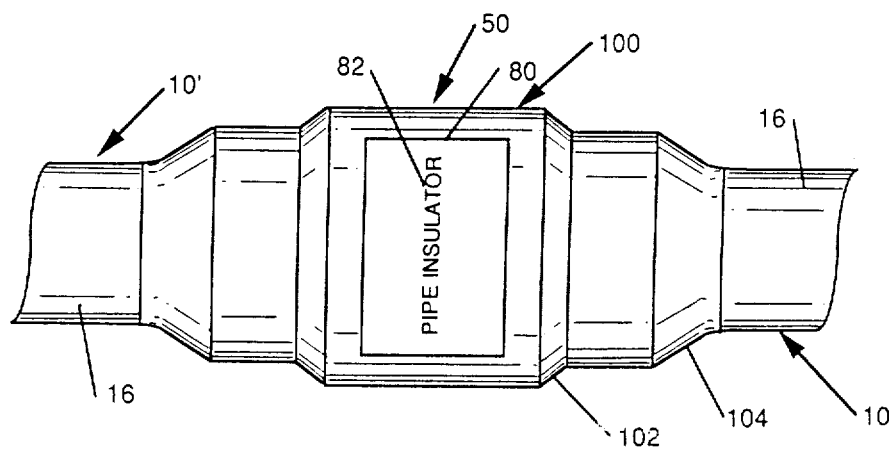
FIG. 6 is a top plan view of an electrical insulated pipe coupling according to the present invention in its fully completed form.

Finally, referring to FIG. 6, a top plan view of the electrically insulated pipe coupling of the present invention is shown. The entire coupling is covered by strands 52 so that the outer protective layer 50 encases the entire coupling 100. It is noted that, if desired, a label 80 including information 82 regarding the insulator such as the company, model number or other technical details regarding the insulator may be embedded in the translucent outermost layers of the windings 52 as shown in FIG. 6. In FIG. 6, surface 102 beveled surface 74 of rigid reinforcing sleeve 70 and surface 104 as shown in FIG. 6 overlies the outer surface 16 of sleeve 10.

Since many changes could be made in the above construction and many apparently widely different embodiments of this invention could be made without departing from the scope thereof, it is intended that all of the matter contained in the drawings and specification shall be interpreted as illustrative and not in a limiting sense.

The embodiments of this invention in which an exclusive property or privilege is claimed are defined as follows:

1. An electrically insulated pipe coupling comprising:
   a first sleeve member and a second sleeve member positioned in axial alignment and including oppositely positioned end portions axially spaced from one another to create an axial space therebetween;
   a resilient annular seal portion gradually formed in situ in said axial space, said seal portion chemically bonding to said oppositely positioned end portions whereby said seal portion provides a low pressure coupling seal between said first and second sleeve members;
   an outer protective layer comprising of continuous uncut synthetic resin saturated fiberglass strand windings encircling at least a portion of the end portions of said first and second sleeve members and encircling all of said annular seal portion; and
   a rigid reinforcing sleeve embedded in and covered by said fiberglass windings of said outer protective layer.

2. An electrically insulated pipe coupling according to claim 1 wherein said end portions each have a plurality of concentric grooves provided therein.

3. An electrically insulated pipe coupling according to claim 2 wherein at least some of said fiberglass windings are provided in said concentric grooves.

4. An electrically insulated pipe coupling according to claim 1 wherein annular seal has an outer diameter dimension substantially equal to an outer diameter dimension of said first and second sleeve members and said annular seal has an inner diameter dimension substantially equal to an inner diameter dimension of said first and second sleeve members.

5. An electrically insulated pipe coupling according to claim 1 wherein an annular seal portion is gradually formed in situ in a continuously applied layer of a liquid urethane material which hardens into a resilient solid urethane seal.

6. An electrically insulated pipe coupling according to claim 1 wherein said fiberglass windings of said protective outer layer are tension windings which exert a radially inwardly compressive force on said annular seal portion.

7. An electrically insulated pipe coupling comprising:
   a first sleeve member and a second sleeve member positioned in axial alignment and including oppositely positioned end portions axially spaced from one another to create an axial space therebetween;
   a resilient annular seal portion gradually formed in situ in said axial space, aid seal portion chemically bonding to said oppositely positioned end portions whereby said seal portion provides a low pressure coupling seal between said first and second sleeve members;
   an outer protective layer comprising of continuous synthetic resin saturated fiberglass strand windings encircling at least a portion of the end portions of said first and second sleeve members and encircling all of said annular seal portion, said outer protective layer including radially innermost windings which are provided in a closely spaced hoop winding pattern; and a rigid reinforcing sleeve embedded in and covered by said fiberglass windings of said outer protective layer.

8. An electrically insulated pipe coupling comprising:
a first sleeve member and a second sleeve member positioned in axial alignment and including oppositely positioned end portions axially spaced from one another to create an axial space therebetween;
a resilient annular seal portion gradually formed in situ in said axial space, said seal portion chemically bonding to said oppositely positioned end portions whereby said seal portion provides a low pressure coupling seal between said first and second sleeve members;
an outer protective layer comprising of continuous synthetic resin saturated fiberglass strand windings encircling at least a portion of the end portions of said first and second sleeve members and encircling all of said annular seal portion, said outer protective layer including radially outermost windings which are provided in a widely spaced helical winding pattern; and
a rigid reinforcing sleeve embedded in and covered by said fiberglass windings of said outer protective layer.

9. An electrically insulated pipe coupling according to claim 1 wherein said rigid reinforcing sleeve and said first and second sleeve members are formed of metal and said annular seal portion and said outer protective layer is formed of an electrically non-conductive materials.

10. An electrically insulated pipe coupling according to claim 1 wherein terminal end portions of said first and second sleeve portion include a beveled or a curved surface.

11. A method for making an electrically insulated pipe coupling comprising the steps of:
positioning and securing a first sleeve member and a second sleeve member in axial alignment onto a mandrel with end portions of said first and second sleeve members axially spaced from one another with an axial space therebetween through which said mandrel fully extends;
rotating said mandrel and said secured sleeve members;
applying a liquid urethane material onto said rotating end portions and onto said mandrel which extends through said axial space to gradually form a resilient seal portion between said end portions thereby joining said end portions together in a sealing engagement;
encircling said end portions and said seal portion with continuous synthetic resin saturated fiberglass strand windings to form an outer protective layer; and
placing a rigid reinforcing sleeve onto said outer protective layer when said layer is partially formed and thereafter completing the formation of said outer protective layer whereby said rigid reinforcing sleeve is embedded in and covered by said fiberglass windings of said outer protective layer.

12. A method according to claim 11 further comprising the step of cutting a plurality of concentric grooves into said ends the first and second sleeve member prior to securing said members onto said mandrel.

13. A method according to claim 12 wherein at least some of said fiberglass windings are provided in said concentric grooves.

14. A method according to claim 11 wherein said liquid urethane is applied until said annular seal portion has an outer diameter dimension substantially equal to an outer diameter dimension of said first and second sleeve members.

15. A method according to claim 11 wherein the portion of said mandrel which extends through said axial space has an outer diameter dimension substantially equal to the inner diameter dimension of said first and second sleeve members.

16. A method according to claim 11 wherein said fiberglass windings of said protective outer layer are encircled around said end portions and said seal portion under high tension to exert a radially inwardly compressive force on said annular seal portion.

17. A method according to claim 11 wherein said fiberglass windings of said protective outer layer are initially encircled around said sleeve ends and said annular seal portion in a closely spaced hoop winding pattern.

18. A method according to claim 11 wherein radially outermost windings of said protective outer layer are encircled around said sleeve ends and said annular seal portion in a widely spaced helical winding pattern.

19. A method according to claim 11 wherein said rigid reinforcing sleeve and said first and second sleeve members are formed of metal and said annular seal portion and said outer protective layer are formed of an electrically non-conductive materials.

20. A method according to claim 11 further comprising the step of beveling or curving terminal end portions of said first and second sleeve members.

21. A method according to claim 11 further comprising the step of applying a chemical primer solution to said end portions prior to applying said liquid urethane.

* * * * *

UNITED STATES PATENT AND TRADEMARK OFFICE
CERTIFICATE OF CORRECTION

PATENT NO. : 5,131,688
DATED : July 21, 1993
INVENTOR(S) : John D. Tricini

It is certified that error appears in the above-identified patent and that said Letters Patent is hereby corrected as shown below:

On Sheet 1 of the drawings, after "Sheet 1 of" delete "2" and insert --3--therefor.

On Sheet 2 of the drawings, after "Sheet 2 of" delete "2" and insert --3-- therefor.

After Sheet 2 of the drawings, insert as a new sheet of drawings, Sheet 3 of 3, which includes figures 5 and 6, as shown on the attached page.

UNITED STATES PATENT AND TRADEMARK OFFICE
CERTIFICATE OF CORRECTION

PATENT NO. : 5,131,688

DATED : July 21, 1992

INVENTOR(S) : John D. Tricini

It is certified that error appears in the above-identified patent and that said Letters Patent is hereby corrected as shown below:

Column 3, line 14, after "which" insert --extends through said axial space (or the protective sleeve--.

Column 3, line 47, after "the" insert --present--.

Column 6, line 61, change "aid" to --said--.

Column 8, line 15, after "ends" insert --of--.

Signed and Sealed this

Fourth Day of January, 1994

Attest:

BRUCE LEHMAN

Attesting Officer

Commissioner of Patents and Trademarks